United States Patent

[11] 3,616,178

[72] Inventors Emanuel Gurin
  Guaynabo;
  Antonio Vazquez, Carolina, both of P.R.
[21] Appl. No. 815,316
[22] Filed Apr. 11, 1969
[45] Patented Oct. 26, 1971
[73] Assignee David M. Company
  Hato Rey, P.R.

[54] ANCHOR-COATED BIAXIALLY STRESS-ORIENTED PLASTIC SHEET LAMINATED TO RUBBER-COATED PAPER FOR USE AS LETTERPRESS AND OFFSET-PRINTING BLANKET
  10 Claims, 4 Drawing Figs.
[52] U.S. Cl........................................... 161/167,
  161/164, 161/190, 161/229, 161/232, 161/401,
  156/280, 156/331
[51] Int. Cl........................................... B32b 27/10,
  B41f 29/00, C09j 7/02
[50] Field of Search........................................ 156/278,
  280, 322, 331, 332; 161/165, 167, 190, 232, 401

[56] References Cited
UNITED STATES PATENTS
2,673,826 3/1954 Ness............................ 161/92
3,147,698 9/1964 Ross............................ 161/160

*Primary Examiner*—John T. Goolkasian
*Assistant Examiner*—Robert A. Dawson
*Attorney*—Abraham A. Saffitz ABSTRACT: Slippage resistant, flexible packing blankets for letterpress and printing blankets for offset are made from a high tensile strength, biaxially stress-oriented plastic sheet which is adhesively laminated to a tough, dimensionally stable, high tensile strength, tear-resistant paper, such as Kraft paper, tympan paper or elastomer impregnated paper sheet. An extensible thermosetting adhesive consisting essentially of an aliphatic copolyester ofterephthalic acid or an elastic esteramide polymer, each reacted with a polyisocyanate curing agent, is used for laminating. The adhesive is cured at room temperature or at a temperature below that which relaxes the stress-oriented plastic sheet. Superior wear-resistance and high quality of printing have been demonstrated for the blankets of the invention. The blanket is useful as an inking member, for example in letterpress printing of the wraparound press-type, and can also be used for the packing material for the impression cylinder in gravure-type of printing.

PATENTED OCT 26 1971                              3,616,178

INVENTORS
EMANUEL GURIN
ANTONIO VAZQUEZ

BY *Abraham A. Saffitz*
ATTORNEY

ANCHOR-COATED BIAXIALLY STRESS-ORIENTED PLASTIC SHEET LAMINATED TO RUBBER-COATED PAPER FOR USE AS LETTERPRESS AND OFFSET-PRINTING BLANKET

BACKGROUND OF THE INVENTION

1. Field of the Invention

The present invention lies in the field of packing blankets and printing blankets used in letterpress printing and printing machines of the offset-type. The packing and printing blankets of the invention comprise laminated sheets of wear-resistant construction embodying a vulcanized elastomeric solvent-resistant surface layer of a smooth paper backing laminated to a biaxiallly stress-oriented, high tensile strength plastic sheet having an anchor coating for resistance to slipping in between the supporting surface and the plastic surface. The paper underlying the vulcanized elastomeric surface layer provides smoothness, compressibility and shock absorbing properties. The blanket withstands severe deformation upon application of printing forces and recovers its shape quickly. If the plastic sheet bearing the antislipping or friction coating is replaced by strong cloth, the paper tears away from the clamps and detracts from printing quality by causing wrinkling of the paper printed during normal operation of the press.

2. Description of the Prior Art

Flexible, laminated paper press blankets and packing blankets of the type shown in Fennone U.S. Pat. No. 1,891,150 and in Page U.S. Pat. No. 2,544,279 have long been known. These blankets employ Kraft or tympan paper sheets in one or more plies which are laminated together with a starch-based adhesive. The blanket of Fennone includes a heavy and porous paper ply for cushioning the impression surface and a muslin backing to reinforce the paper.

These laminated paper blankets have not resisted wearing and have torn quite easily in high speed printing operations. The harder surface packing blankets have caused excessive wear of the printing plate which, in turn, leads to loss of printing quality.

Prior attempts have been made to use strong plastic sheets, such as polyvinyl chloride, cellophane or rubber hydrochloride, in printers' blankets which are intended to combine a smooth working surface with a resilient backing, as shown in Fredericks U.S. Pat. No. 2,792,321 and Vasel U.S. Pat. No. 12,285,763. The plastic top sheet of the blanket did not resist embossing and deformation and caused excessive wear of the printing plate in high-speed printing.

Conventional woven fabric-reinforced lithographic printing blankets have been tried as packing blankets for letterpress printing but are unsatisfactory because the printing quality is poor, e.g., the dots are blurred, the blanket creeps during printing and tears away from the grippers, and excessive wrinkling and buckling of the printed paper sheet occurs due to the high elongation and relatively poor dimensional stability of the material as a packing.

Mylar sheet material laminated to tympan paper has been used commercially, Mylar side up (for protection of paper from the oil which is used on the second printing machines or units.) As the top packing material, in thicknesses of 10–40 mils, for letterpress printing, Mylar sheet material has not been satisfactory because of excessive plate wear and because it embosses badly after about 700,000 impressions. The plate wear and embossing cause poor printing quality and the printing quality deteriorates very rapidly at the end of the run to add to the expense for high-quality printing.

Elastomer coated tympan paper in total thicknesses up to 12 mils has been used as the top packing sheet in letterpress printing but has been unsatisfactory because it embosses just as quickly, and in certain cases even more quickly, then the Mylar sheet laminated tympan paper packing referred to above, and this embossing further causes poor printing quality. This packing causes wrinkling of the paper sheet being printed which detracts further from the quality. Accordingly, the thin elastomer-coated tympan paper is less desirable than the Mylar laminated tympan paper in respect to printing quality even though it has better properties in respect to plate wearing.

Elastomer-coated tympan paper in total thickness of greater than 12 mils is unsatisfactory because the packing tears away from the grippers. Once the packing tears, the plate is damaged and the press must be shut down. The pressman is constantly on the alert for this tearing at the clamps.

Reinforcing the edge openings at the clamps has been tried but it was not judged satisfactory because of the high cost and because no more than 700,000 impressions were achieved before the printing quality failed.

Thus all of the prior art packing blankets for letterpress have been deformed and have been found to cause excess damage and wear at the surface of the printing plate. This Reinforcing in breakdown of the machine. Shutdowns during printing operations are costly and the pressman must be constantly on the alert to a breakdown caused by the tearing of the blanket from the cylinder or by the wearing of the printing surface.

It was surprising to find that Mylar sheet laminated to paper which is provided with a coating of elastomer on the outer surface thereof produced a 10-fold increase in packing life in letterpress printing with normal handling if, and only if, an anchor coating is applied in between the Mylar surface of the laminated packing and the surface that is supporting it. If this anchor coating is absent, the life of the laminated Mylar and paper sheet coated with elastomer on the outer surface thereof (before tearing) in letterpress printing is only a few thousand impressions. Without the anchor coating on the Mylar surface, the Mylar-laminated paper coated with elastomer on the paper side is thus greatly inferior in its tendency to wear at the clamps than rubber coated tympan paper and than the Mylar-tympan laminates.

SUMMARY OF THE INVENTION

The present invention relates to slip-resistant, Mylar-reinforced, wear-resistant, elastomer packing blanket and elastomeric printing blanket constructions which are subjected to severe deformation upon the application of printing forces and which recover their original shapes upon removal of these forces as a result of the unique combination of the structure and the materials employed in the manufacture.

The novel printing blanket and packing blanket structures are provided by the laminated reinforcement of a biaxially stress-oriented Mylar (polyethylene terephthalate) or cellulose triacetate sheet having a thickness of between about 2 and 16 mils adhered to a dimensionally stable, high tensile strength elastomer-coated paper, such as Kraft paper, tympan paper or polymerized, latex-impregnated paper sheet, the paper having a thickness of between about 3 and about 28 mils, the thickness of the Mylar or acetate sheet reinforcement being generally, but not necessarily, limited to being less than the thickness of the coated paper. The Mylar or acetate sheet is adhered to the elastomer-coated paper with an extensible thermosetting adhesive and the two-layer composite is coated on the plastic side with an anchor coat ranging from friction to a pressure sensitive adhesive coating.

Resistance to slipping is provided between the bottom face of the top blanket and the supporting surface to provide a packing blanket embodiment that resists tearing out of the clamps during regular usage and handling. The slip resistant surface may be produced by texturing the face or may be in the form of an anchor coating comprising friction-imparting ingredients or a pressure-sensitive adhesive coating. The stresses created along the longitudinal direction of the blanket against the cylinder during high-speed rotation and during starts and stops are alleviated and equalized by the new blanket. The elastomer-coated paper cushions the vertical shock stresses imparted by the printing cylinder. The biaxially stress-oriented plastic film limits the degree of lateral elongation of the paper sheet and makes the paper more resistant to tearing.

The thicknesses of paper and plastic sheet are selected to adapt the blankets for existing printing cylinders in a total single-blanket thickness of between 10 and 77 mils and up to 158 mils in multiple blanket assembly. These one and two-piece blankets may be used with or without added packing material.

The extensible thermosetting adhesive has a degree of extensibility of at least 150 percent, preferably from 300–700 percent, a high rate of elastic recovery (90–100 percent recovery) and is preferably cured at room temperature to provide a dimensionally stable bond which is resistant to the vertical and lateral shock forces to which the laminated blanket is subjected and which is also resistant to aging, solvents and peeling forces.

A preferred thermosetting laminating adhesive of the present invention is a thermosetting aliphatic copolyester with terephthalic acid, as shown in Snyder U.S. Pat. Nos. 2,623,031 and 2,623,033, which has been reacted with a polyisocyanate of the type shown in Bunge et al., U.S. Pat. No. 2,855,421. Another thermosetting adhesive is an ester-amide interpolymer of the type shown in Brubaker et al. U.S. Pat. No. 2,224,037, which is reacted with a polyisocyanate of the Bunge-et Bunge et al. type.

An epoxy resin-NBR mixture or a phenolic resin-NBR mixture which sets with curing agent at room temperature or temperature below those that relax the biaxially stressed plastic may also be used as the adhesive. These mixtures may also be reacted with polyisocyanate.

Biaxially stress-oriented cellulose triacetate laminated to elastomer-coated paper and provided with an anchor coating exhibits outstanding dimensional stability but is not as tear-resistant as the Mylar-laminated construction.

The Mylar paper laminate which is coated with a vulcanized solvent-resistant elastomer on the paper side provides a surface which is suitable for printing machines of the offset-type. This printing blanket may be used as a one-piece blanket with or without conventional underpacking for letterpress or offset printing.

When the blanket as so described is used, it exhibits unusually long wear and provides high quality printing. More than 7,000,000 impressions have been achieved in high-speed letterpress printing without any noticeable deformation or embossing of the surface. The high quality of the printing was unchanged and the test was stopped before the printing deteriorated. The upper limit for wearing is not known. It is remarkable that the life of the plate is substantially increased and the cost of high-quality printing reduced.

Novel packing and printing blankets and a preferred novel method for their manufacture provide superior quality of printing. The new blankets are long wearing and have been used in high-speed letterpress printing for more than 7,000,000 impressions without noticeable deformaion or embossing of the top surface which consists of a thin vulcanized rubber coating. The general blanket construction, as shown in the drawing, comprises:

| Layer | Thickness In Inches |
| --- | --- |
| A. Surface coating of vulcanized elastomer | 0.0010–0.0250 |
| B. Smooth, tough paper sheet (Kraft, tympan or cross-linked latex impregnated paper) | .0020–.0280 |
| C. Extensible thermosetting adhesive | .0010–.0040 |
| D. Biaxially stress-oriented plastic sheet (Mylar, cellulose acetate) | 0.0005–0.0160 |
| E. Anchor coating | 0.0010–0.0040 |

It is an essential feature of the novel method of the invention that the surface coating of vulcanized elastomer be applied to the paper sheet in the desired thickness and vulcanized at elevated temperature before the paper sheet is bonded to the biaxially stress-oriented plastic sheet with the extensible thermosetting adhesive. Preferably, the adhesive is applied to the back of the paper sheet at room temperature from solvent solution to precisely predetermined thickness within the range shown above. Curing of the adhesive is at room temperature and there is no high temperature condition to which the biaxially stress-oriented plastic sheet is subjected which would relax the plastic and distort it in either the thickness or longitudinal dimension. Accuracy and dimensional stability are thereby achieved. Then the plastic face is coated with an anchor coat deposited from solution. The solvent is evaporated at temperatures below 150° C. to prevent relaxing of the plastic sheet member.

If desired, a pressure-sensitive adhesive coating may be applied to the surface coating of vulcanized elastomer in a thickness from 0.001 to 0.004 inches and this adhesive-coated blanket in contact with the metal of the cylinder may be used as the packing in a single blanket or in a multiple blanket packing assembly for letterpress printing.

It is an object of the invention to provide a wear-resistant blanket for packing or offset printing purposes comprising a biaxially stress-oriented plastic sheet laminated with low-temperature curing thermosetting adhesive to a tough, high tensile strength paper sheet, the paper sheet being first sealed with a solvent or ink resistant vulcanized elastomer coating and then laminated to the plastic sheet which is provided with a thin anchor coating It is a further object of the invention to provide one- and two-piece assemblies of the aforesaid laminated blanket in which a lower packing blanket of the two-piece assembly is mounted on the printing cylinder with the vulcanized elastomer-coated paper face in contact with the metal of the cylinder and the anchor-coated plastic sheet thereof supporting the anchor-coated plastic surface of the upper blanket.

A further object of the invention is to provide a one- or two-piece assembly of the aforesaid laminated blanket in which the lower packing blanket of the two-piece assembly is mounted on the printing cylinder and secured thereto with a pressure-sensitive adhesive.

A further object is to provide two-piece packing assemblies for mounting to a printing cylinder in which the aforesaid blanket of the invention is supported by a conventional underpacking, such as paper, latex-saturated paper or a printing blanket.

It is a further object of the invention to provide a novel method for manufacturing a wear-resistant blanket comprising the steps of vulcanizing a solvent or ink resistant coating to a smooth, tough paper sheet and thereafter bonding the paper sheet to a stress-oriented plastic sheet by means of extensible thermosetting adhesive at a temperature whereby the dimensions of the blanket are not distorted.

It is still a further object of the invention to provide a flexible blanket or blankets in two-piece assembles ranging in thickness between 10 and 158 mils for fitting the undercut in commercial printing cylinders used in letterpress printing and in offset printing and in even higher thicknesses where more than two blankets are assembled, such as in newspaper printing.

Other and further objects and advantages of the invention will become apparent from the accompanying drawing, the subsequent description and the examples.

Figure 1:
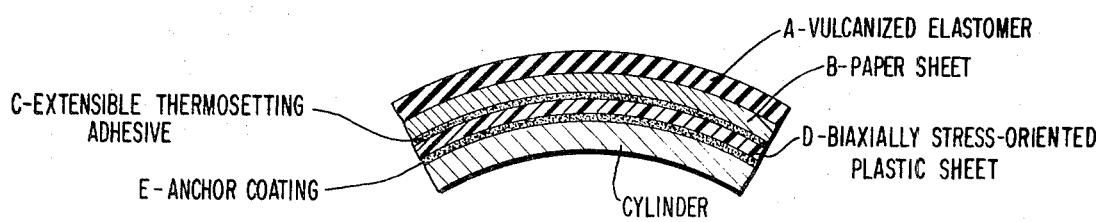
FIG. 1 is a diagrammatic section of a top packing blanket of the invention against a packing cylinder in letterpress printing which is the same relationship for the printing cylinder in offset printing and shows the placement of the antislipping or anchor-coating of the plastic sheet backing against the metal of the cylinder.
Figure 2:
FIG. 2 is a diagrammatic section of an underpacking blanket for a printing cylinder useful in letterpress or in offset printing and shows a pressure-sensitive adhesive coating serving as the antislipping coating which is provided over the elastomer-sealed paper surface.
Figure 3:
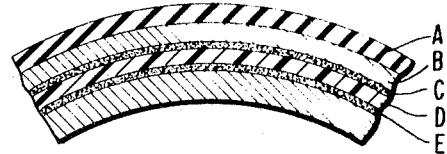
FIG. 3 is a diagrammatic section of a top printing or packing blanket in a two-piece assembly with conventional underpacking with a pressure-sensitive adhesive layer securing the conventional underpacking for letterpress or offset to the metal surface of the cylinder.
Figure 4:
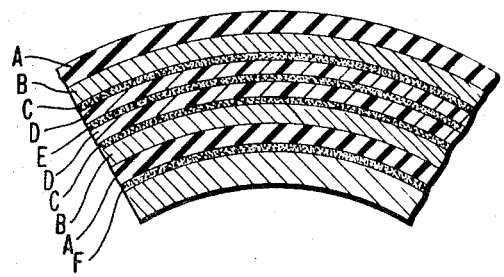
FIG. 4 is a diagrammatic section of an underpacking in a two-piece assembly with the pressure-sensitive adhesive coating provided at the surface of the elastomer-coated paper, the anchor coat engaging the anchor-coated surface of the top packing blanket of FIG. 1 and the pressure-sensitive adhesive contacting the metal of the cylinder.

The laminated embodiments shown in FIGS. 1–4 are prepared by selecting a biaxially stress-oriented, tough, high tensile strength plastic sheet, such as polyethylene terephthalate or cellulose triacetate, in the required thickness and by laminating this plastic sheet to the paper sheet. The paper B may be Kraft paper, tympan paper, or rubber impregnated paper like the one set out in Hechtman et al. U.S. Pat. No. 3,026,217, which constitutes a tough compressible paper sheet. This type of paper is also described in the product of Martin U.S. Pat. No. 3,036,950 and the products of Fiegley et al. U.S. Pat. No. 2,786,759 and 2,905,583. These papers have polymerized natural or synthetic rubber latex added to the beater or to the nip of the loosely bonded fibers prior to rolling during the papermaking process. The amount of rubber or synthetic resin elastomer added is generally between 30 and 120 parts per 100 parts by weight of dry paper fibers. The rubber or resin is selected to give high resistance against tearing and compressibility, as shown in the above-cited Hechtman et al. patent.

The laminating adhesive is applied in a thickness of between 1 and 4 mils to the back of the paper sheet and a polyisocyanate curing agent permits the adhesive to be cured at room temperature so that there is no high temperature condition to which the plastic sheet is subjected, thereby eliminating distortion and permitting accuracy of dimensioning to within one ten-thousandth of an inch.

The anchor coating E is preferably a thermosetting antislipping coating which consists of a thermosetting adhesive of the type used for laminating, or it may be a pressure-sensitive adhesive. The pressure-sensitive adhesive is coated from solvent dispersion wherein the solvent is a volatile, normally liquid organic solvent which does not attack the plastic sheet and the adhesive may contain dissolved polymer components, such as vinyl ester polymer (Vinylite AYAF), chlorinated vinyl chloride polymer, isobutylene polymer, SBR rubber, chlorinated rubber, natural rubber, butyl rubber, polyurethane, rubber and the like, and a tackifier such as wood, rosin, glycol esters of rosin or maleic anhydride modified ester gum and the like. Other agents, such as softening agents, stabilizers, liquid plasticizers, etc., may be present. The tackifiers are well-known commercial products sold under such names as "Wood Rosin WG", "Polypale Ester No. 2", "Kenflex A", "Cumar V 1/2", "Staybelite", "Piccolyte", "Polypale Ester No. 10", and "Vistac-1" (a low molecular weight hydrocarbon polymer produced by Advance Solvents and Chemical Corporation (New York, New York) Saybolt viscosity (Univ.) (210° F.) 2,800 +sec., density 7.5 lb./gal.)

It is also desirable to add one or more stabilizers such as organophosphates, dibasic lead phosphite, phenyl glycidyl ether, dibutyl tin maleate, diglycidyl ether of bis phenol, lead salts or organic or inorganic acids, barium and cadmium salts of naphthenic or ricinoleic acids, and one or more antioxidants such as hydroquinone, lecithin, propyl gallate, thiodipropionates including lauryl thiodipropionate, nordihydroguaiaretic acid, butylated hydroxy anisole, diphenyl amine, alpha phenyl naphthylamine, beta phenyl naphthylamine, etc.

The aforesaid adhesive composition, in the practice of this invention, can be spread upon the paper or the plastic film by means of an applicator, following which the applicator can be withdrawn from the adhesive coating without the development of stringiness. For best results, the adhesive coating is spread on the backing to a dry coating thickness of 0.001 to 0.003.

In the selection of an anchor coating E which contains antislipping filling components, these components are high oil-absorptive thixotropic pigments which stiffen the fluid resinous coating. These high oil-absorptive thixotropic fillers are finely divided, inorganic solids such as short fiber asbestos of fine, standard plastic filler grade, pulverized dehydrated silica gel in uncompressed state, e.g. Cab-o-sil, Godfrey L. Cabot Co., "PD—244 PD-244 Silica", Davison Chemical Co., or Santocel, Monsanto Chemical Co., certain natural and/or treated clays which include combined water in their structure (so-called hydrous clays,) e.g. bentonite, etc.

The asbestos shorts, silica gel and hydrous clays are employed in small amounts, usually between about 0.5 percent and 5 percent by weight. Each of the three classes of materials is of hydrous nature, having small amounts of water combined chemically into its makeup, and it is believed that it is the hydrous quality of each and the great surface area presented that aids in developing the desired rheological properties. The silica gels represented by Cab-o-sil, Santocel and "PD-244 Silica" are dry free-flowing powdery products which still contain small amounts of combined water in their gel structure and are submicroscopic particles having an $SiO_2$ content (dry basis) of 99.0–99.7 percent, a free moisture content of 0.2–2.0 percent at 105° C. and a negligible content of calcium oxide, magnesium oxide and ferric oxide. Opaline hydrous siliceous minerals, such as hyalite and diatomite, are natural products comparable to the above-manufactured products which in comminuted form can also be used.

Finely divided solid materials of a hard abrasive nature may be added to impart reinforcement and slip resistance. Thus, pulverized sand, pumice, aluminum carbides, aluminum silicides, garnet, glass, porcelain, blast furnace slag, etc. represent comminuted abrasive materials which can be used.

DESCRIPTION OF THE PREFERRED EMBODIMENTS

General Procedure for Assembling and Laminating and Selection of Materials

A. Surface coating of Vulcanized Elastomer Applied to Paper Sheet B

The vulcanized elastomer A of the top layer is deposited from an inert volatile solvent solution onto the smooth, dimensionally stable, tough paper B. Kraft paper having a hard surface finish and a Mullen bursting strength of 50 to 200 pounds is provided with a vulcanized synthetic elastomer or vulcanized natural rubber coating in a thickness of from 0.001 to 0.025 inches. Thicknesses above 0.025 inch are not necessary to achieve the desired results and in thicknesses below 0.001 inch, it is impossible to achieve the solvent and abrasion protection required for this invention. The high-strength Kraft paper is commercially available at thicknesses of from 0.008 to 0.25 inches. Other strong fiber papers may be used in the same dimensions, such as tympan paper, paper made from jute fibers, paper made from sisal fibers, and paper made by the sulfite process, but these must be as strong as the Kraft paper.

The elastomer A is dissolved or dispersed in a volatile solvent with curing agent or accelerator, activator such as zinc oxide, plasticizer such as stearic acid, softener such as tricresyl phosphate, paraffin, dibutyl phthalate and the like, antioxidant such as phenyl-α-napthylamine or the like, and filler and reinforcing pigment such as carbon black, whiting, clay and the like. The mixture is milled, coated onto the paper and vulcanized at 250–340° F. for from 15 minutes to several hours. The lower vulcanizing temperatures are preferred since higher temperatures tenderize the paper.

The elastomers in accordance with the table below have been formulated to provide solvent resistance, good compression set, high-cure rate, good tear resistance and abrasion resistance. The vulcanized coatings employ the vulcanizing agent (accelerators and promoters,) reinforcing pigments and softeners recommended by the supplier of the material, and have produced Shore A Durometer hardness values lying between 30 and 95. The selection of the elastomer material takes into account the compatibility with the anchor coating and pressure-sensitive adhesive materials employed and the composition of the printing inks and ink solvents used in thinning the inks or the solvents used for cleaning or wiping.

The thickness of vulcanized elastomer layer A lies between 0.003 and 0.015 inches when the blanket is used for offset printing on hard surfaces such as metal, and lies between 0.013 and 0.022 inches when printing is to be done on soft surfaces such as cardboard. In offset printing of letter-writing stock, layer A may be between 0.005 and 0.020 inches, the heavier thickness giving longer life.

The top layer of the blanket which is placed next to the paper in the letterpress machine or which is used as the printing surface in the offset printing machine is a cross-linked or vulcanized elastomer compounded in a hardness range of from 30–96 Shore A Durometer value, typical vulcanized elastomers being based on natural rubber, polyisoprene, NBR rubber, butyl rubber, chlorinated polyisoprene, polyethylene rubber, EPDM rubber, polysulfide rubber, silicone rubber, fluorosilicone rubber, polyvinyl chloride rubber, ethyl acrylate rubber, neoprene rubber, EPR copolymer rubber, polyurethane rubber of the Elastothane type, fluoro elastomers of the Viton A- and Viton B-types, epichlorohydrin rubbers of the Hydrin type, propylene oxide rubbers of the Dynagen type, chlorosulfonate polyethylene rubbers of the Hypalon type and SBR rubbers.

B. Summary of Elastomer Properties the friction coating may vary from 1 to 4 mils, preferably about 2 mils. The same curing cycle as for the laminating adhesive is followed. This extends the life of the blanket from 110 to 20 times that of any comparable blanket of the prior art and it is believed that the increased life is due to the curing cycle at room temperature.

D. Friction and Pressure-sensitive Adhesive Formulations.

The following formulas illustrate the anchor coating based on pressure-sensitive adhesive F:

FORMULA 1

| Ingredient | Parts By Weight |
| --- | --- |
| SBR rubber (3 parts butadiene with 1 part styrene) | 12.0 |
| Rosin (specific gravity 1.08, melting point 100–150° C.) | 10.0 |
| Graphite (black lead) | 6.0 |
| Lanolin | 2.0 |
| Agerite resin antioxidant (aldol-α-naphthyl amine) | 0.5 |
| Benzene | 29.5 |

FORMULA 2

| Ingredient | Parts By Weight |
| --- | --- |
| SBR rubber (3 parts butadiene with 1 part styrene) | 100.0 |
| Zinc oxide | 20.0 |
| Lecithin | 2.5 |
| Pentalyn H (penetaerythritol esters of rosin) | 10.0 |
| Bakelite Resin BR 14634 (thermoplastic phenol formaldehyde resin) | 5.0 |

TABLE

| Elastomer | Abrasion resistance[1] | Solvents resisted by elastomer | Solvents not resisted by elastomer | Other outstanding physical properties |
| --- | --- | --- | --- | --- |
| Natural rubber | 1 | Alcohols | Hydrocarbons | High tear resistance. |
| Synthetic polyisoprene | 1 | do | do | Do. |
| SBR rubber | 1 | do | Aromatic hydrocarbons | Easy processing, low cost. |
| Neoprene rubber | 3 | Aliphatic hydrocarbons and alcohols. | do | Resists crystillization and flexing. |
| NBR rubber | 4 | Aromatic and aliphatic hydrocarbons. | Alcohols | Easy processing, low cost. |
| Polyurethane rubber (Elastothane)[2] | 1 | do | do | Aging and oxidation resistance. |
| Polyethylacrylate rubber (Thiacril)[3] | 3 | do | do | Resists ozone, heat and aging. |
| Butyl rubber | 3 | Alcohols | Aromatic and aliphatic hydrocarbons. | Resists oxidation and heat. |
| Ethylene propylene terpolymer | 3 | do | do | Resists aging. |
| Epichlorohydrin rubber (Hydrin)[4] | 3 | Aromatic and aliphatic hydrocarbons. | Alcohols | Resists oxygen and aging. |
| Chlorosulfonated polyethylene (Hypalon).[5] | 3 | do | do | Resists heat. |
| Propylene oxide (Dynagen).[6] | 3 | do | do | Resists ozone, heat and aging. |
| Polyfluoroethylene (Viton)[7] | 2 | Aromatic and aliphatic hydrocarbons and alcohols. | Chlorinated hydrocarbons | Resists heat and aging. |
| Polysulfide (Thiokol)[8] | 4 | All solvents | None | High oxidation resistance. |
| Silicone (polysiloxane) | 4 | Aliphatic hydrocarbons | Aromatic hydrocarbons | Resists high heat. |
| Polybutadiene | 1 | Alcohols | Hydrocarbons | Good heat aging. |
| Fluorosilicone | 4 | All solvents | None | Outstanding chemical resistance. |
| Styrene-isoprenestyrene block polymer | 2 | Alcohols | Hydrocarbons | Good oxidation resistance. |

[1] Scale of 1 for high abrasion resistance, 2 for medium to high abrasion resistance, 3 for medium to fair abrasion resistance and 4 for low abrasion resistance.
[2] Trademark of Thiokol Chemical Corporation.
[3] Trademark of Thiokol Chemical Corporation.
[4] Trademark of B. F. Goodrich Company.
[5] Trademark of Du Pont.
[6] Trademark of General Tire and Rubber Company.
[7] Trademark of Du Pont.
[8] Trademark of Thiokol Chemical Corporation.

C. Blanket Layer Dimensions

TABLE

| Undercut of cylinder (inches) | Layer of blanket (in inches) | | | | | |
| --- | --- | --- | --- | --- | --- | --- |
| | A | B | C | D | E | F |
| .0105 | .0025 | .0030 | .0015 | .0005 | .0010 | .0020 |
| .0240 | .0025 | .0110 | .0015 | .0060 | .0010 | .0020 |
| .0335 | .0040 | .0210 | .0015 | .0080 | .0010 | |
| .0420 | .0025 | .0230 | .0015 | .0120 | .0010 | .0020 |
| .0770 | .0250 | .0280 | .0040 | .0160 | .0040 | |
| .0810 | .0250 | .0280 | .0040 | .0160 | .0040 | .0040 |

The friction coating F is applied to the Mylar or cellulose triacetate surface. The preferred plastic vehicle for the friction coating is the aliphatic copolyester-containing hydrated silica filler and cured with polyisocyanate. The thickness of

FORMULA 3

| Ingredient | Parts By Weight |
| --- | --- |
| SBR rubber (3 parts butadiene with 1 part styrene)—Mooney Viscosity 50 | 100.0 |
| Glycol ester gum | 75.0 |
| Zinc oxide | 80.0 |
| Sulfur | 0.3 |
| Diethyl thiuram disulfide | 0.3 |
| Zinc butyl dithiocarbamate | 0.3 |

FORMULA 4

| Ingredient | Parts By weight |
| --- | --- |
| Vinylite (AYAF Grade) (polymerized vinyl acetate, vinyl alcohol-acetate) | 5.0 |
| Arofene 700 (100% phenolic resin) | 36.0 |
| Butyl phthalyl butylglycollate | 18.0 |

FORMULA 5

| Ingredient | Parts By Weight |
|---|---|
| Parlon 1259 Type (white, odorless, nonflammable granular powder, a chlorinated natural rubber) | 5.0 |
| Staybelite Ester 10 (pale, hard resin, glycerol ester of hydrogenated rosin) | 10.0 |
| Dibutyl phthalate | 10.0 |
| Acetone | 52.5 |
| Hexane solvent | 22.5 |

FORMULA 6

| Ingredient | Parts By Weight |
|---|---|
| Milled pale crepe | 100.0 |
| Polymerized β-pinene resin | 75.0 |
| Polymerized trimethyl dihydroquinoline | 2.0 |
| Petroleum oil | 5.0 |

FORMULA 7

| Ingredient | Parts By Weight |
|---|---|
| sheet rubber | 100.0 |
| Zinc oxide | 50.0 |
| Dehydrogenated rosin | |
| Sym-di-β-naphthyl-p-phenylene diamine | 2.0 |
| Lanolin | 2.0 |

FORMULA 8

| Ingredient | Parts By Weight |
|---|---|
| 70 Butadiene: 30 styrene copolymer (Mooney Viscosity 50) | 50.0 |
| Milled smoke sheet rubber (natural rubber) | 50.0 |
| Ester of hydrogenated rosin | 50.0 |
| Polymerized trimethyl dihydroquinoline | 2.0 |
| Petroleum oil | 20.0 |

FORMULA 9

| Ingredient | Parts By Weight |
|---|---|
| Polyvinyl ethyl ether (intrinsic vis.=2.37) | 100.0 |
| Hydrogenated rosin | 50.00 |
| Phenyl-α-napthylamine | 0.35 |
| Polyethylene gylcol 400 diricinoleate | 11.50 |

FORMULA 10

| Ingredient | Parts By Weight |
|---|---|
| polyisobutylene (high molecular weight solid polymer) | 100.0 |
| Polyisobutylene (viscous liquid) | 70.0 |

FORMULA 11

| Ingredient | Parts By Weight |
|---|---|
| Vistanex MML-100 (polyisobutylene rubber) | 100.0 |
| Amberol ST-137K (oil-soluble phenol formaldehyde polymer in solid form) | 45.0 |
| Pentalyn K (pentaerythritol ester of rosin) | 45.0 |
| Paraffinic process oil (make up to 15% solids in naphtha) | 50.0 |

FORMULA 12

| Ingredient | Parts By Weight |
|---|---|
| Enjay butyl 268 (butyl rubber) | 100.0 |
| Polyac softener (25% poly-p-dinitroso benzene in inert wax) | 0.7 |
| Zinc oxide | 50.0 |
| Hydrated alumina | 50.0 |
| Piccolyte S-115 (thermoplastic terpene resin consisting essentially of β-pinene polymers) | 70.0 |
| Paraffinic process oil (make up to 20-40% solids in naphtha) | 40.0 |

FORMULA 13

| Ingredient | Parts By Weight |
|---|---|
| Polyester-polyurethane rubber | 100.0 |
| Zinc oxide | 50.0 |
| Rosin (specific gravity 1.08, melting point 100°-150° C.) | 10.0 |
| Santolite MPH (condensate product of Formaldehyde with aromatic sulfonamide) | 4.5 |
| Graphite (black lead) | 7.0 |

FORMULA 14

| Ingredient | Parts By Weight |
|---|---|
| Hydrin (polyester rubber) | 100.0 |
| Agerite resin (aldol-α-naphthyl amine) | 1.0 |
| Zinc oxide | 50.0 |
| Acetone | 60.0 |
| Lanolin | 2.0 |

FORMULA 15

| Ingredient | Parts By Weight |
|---|---|
| Ethyl Acrylate polymer in acetone | 27.5 |
| Polyvinyl-acetate-ethyl acrylate copolymer resin | 2.4 |
| Sucrose acetate isobutyrate | 6.5 |
| Polymolecular product of α-methyl styrene | 1.9 |
| Toluene | 41.8 |
| Xylene | 19.9 |

FORMULA 16

| Ingredient | Parts By Weight |
|---|---|
| Chlorosulfonated Polyethylene | 12.0 |
| Polychlorinated polyphenyl | 12.0 |
| Ethylene glycol ester of polymerized rosin | 18.0 |
| Toluene | 58.0 |

FORMULA 17

| Ingredient | Parts By Weight |
|---|---|
| Pale crepe | 100.0 |
| Aluminum hydrate | 60.0 |
| Polyterpene resin (melting point 70° C.) | 30.0 |
| Polyterpene resin (melting point 115° C.) | 30.0 |
| Lanolin | 10.0 |
| Agerite antioxidant | 1.0 |

FORMULA 18

| Ingredient | Parts By Weight |
|---|---|
| Pure gum reclaim rubber (83.3% rubber hydrocarbon) | 120.0 |
| Zinc oxide | 70.0 |
| Polyterpene resin (melting point 70° C.) | 80.0 |
| Liquid hydrocarbon plasticizer (heavy, clear liquid composed of high molecular weight hydrocarbons) | 20.0 |
| Agerite antioxidant | 2.0 |

FORMULA 19

| Ingredient | Parts By weight |
|---|---|
| 75 Butadiene: 25 styrene (Mooney Viscosity 70) | 50.0 |
| Polyisobutylene (molecular weight of 100,000) | 50.0 |
| Glycerol ester of hydrogenated rosin (melting point 84° C.) | 55.0 |
| Polyisobutylene (molecular weight of 1100) | 5.0 |

FORMULA 20

| Ingredient | Parts By Weight |
|---|---|
| Polyvinyl ethyl-ether-amorphous (intrinsic vis.=2.37) | 100.0 |
| Hydrogenated rosin (melting point 76° C.) | 5.0 |
| Agerite antioxidant | 0.4 |

Illustrative Example for Paper Layer A

This example illustrates the manufacture employing three species of paper for layers B and Buna-N for layer A. The three species of paper are: (1) high tensile strength Kraft paper with Mullen-bursting strength of 90 pounds, (2) tympan paper in thickness of 0.005 inch; and (3) latex impregnated paper in thickness of 0.011 inch. A mixture of 100 parts by weight of Buna-N, 1 part of Santocure-1 accelerator (N-cyclohexyl-2-benzothiazylsulfonamide), 1 part of Neozone-A (pnenyl-αnapthalamine), 50 parts of carbon black, 10 parts of dibutyl phthalate, 5 parts of zinc oxide, 2 parts of sulfur and 1 part of stearic acid were milled and dispersed in toluene, there being 1 part of toluene for each part of solids. The mixture was milled and coated on the paper to a thickness of 0.003 inches and then was vulcanized at 290° F. for 2 hours. The cured products comprise the vulcanized elastomer layer A coated onto the top side of paper layer B.

The copolyester of example 1 of Snyder U.S. Pat. No. 2,623,031 was dissolved in toluene and was reacted with the polyisocyanate of example 1 of Bunge et al. U.S. Pat. No. 2,855,421. This solvent solution of adhesive components was coated from toluene solvent onto the bottom side of paper layer B in a thickness of 0.0015 inch after the solvent was evaporated therefrom at a temperature less than 150° F. The adhesive coated surface of the paper was laminated to biaxially stress-oriented Mylar which had a thickness of 0.006 inch. The laminated product was then coated on the Mylar surface with a friction coating comprising 3 parts by weight of hydrated silica per 100 parts of dry adhesive solids in the same toluene solution was used for the adhesive layer C. The solvent was evaporated at 100° C. This provides the friction coating layer E.

Both printing and packing blankets were prepared in accordance with the dimensions shown in the table under (c) above, Blanket Layer Dimensions.

As mentioned in the Summary of the Invention and as illustrated in the figures of the drawing, the novel packing blankets of the invention provide superior wear-resistance and high quality of printing when used as a packing blanket for letterpress printing or as an offset member. The blanket is also generally useful as an inking member in printing. In letterpress printing of the wraparound press-type the present blanket is especially adapted for use as the inking member. In gravure printing, the present blanket may be used as the packing member for the impression cylinder. Accordingly, the term blanket herein is seen to cover the printing application of the present novel blanket in letterpress printing and in gravure printing and also includes the application of the blanket as an inking member for letterpress printing of the wraparound-type.

We claim:

1. An elastomeric flexible laminated blanket adapted for use as a top packing material for letterpress printing or for offset printing comprising:
   a tough smooth dimensionally stable high tensile strength, tear-resistant paper selected from the group consisting of Kraft paper, tympan paper and latex-impregnated paper;
   said paper being coated with a solvent-resistant vulcanized elastomer having a Shore A Durometer hardness value between about 30 and about 95;
   said paper being adhesively laminated to a biaxially stress-oriented plastic sheet selected from the group consisting of polyethylene terephthalate and cellulose acetate;
   the adhesive of said laminate consisting essentially of an aliphatic copolyester of terephthalic acid reacted with a polyisocyanate curing agent or an elastic ester amide polymer reacted with a polyisocyanate curing agent, said adhesive being a thermosetting extensible elastic material having rapid recovery and being cured at a temperature below the relaxation temperature of the plastic sheet; and
   an antislip, solvent-resistant anchor coating for the outside of said blanket, said anchor coating being selected from the group consisting of a nonblocking friction coating and a pressure-sensitive adhesive coating which prevents creeping of said blanket during printing.

2. An elastomeric flexible laminated blanket as claimed in claim 1 for use, vulcanized elastomer-side up, as a top packing blanket for letterpress, wherein said anchor coating is applied to the outer surface of said plastic sheet which is on the bottom of the blanket.

3. An elastomeric flexible laminated blanket as claimed in claim 1 for use, plastic-side up, as a top packing blanket for letterpress, wherein said anchor coating is applied to the outer surface of said vulcanized elastomer coated paper which is adapted to be pressed against the cylinder.

4. An elastomeric flexible laminated blanket as claimed in claim 1 for use, vulcanized elastomer-side up, as an offset printing blanket, wherein said vulcanized elastomer layer is between 0.003 and 0.025 inches in thickness, said paper is between 0.003 and 0.028 inches in thickness, and said plastic sheet has a thickness of 0.0005 to 0.016 inches and is provided on its outer side with said antislipping coating.

5. A two-piece blanket assembly comprising an underpacking and a top laminated flexible blanket consisting essentially of:
   a tough smooth dimensionally stable high tensile strength, tear-resistant paper selected from the group consisting of Kraft paper, tympan paper and latex-impregnated paper;
   said paper being coated with a solvent-resistant vulcanized elastomer having a Shore A Durometer hardness value between about 30 and about 95;
   said paper being adhesively laminated to a biaxially stress-oriented plastic sheet selected from the group consisting of polyethylene terephthalate and cellulose acetate;
   the adhesive of said laminate consisting essentially of an aliphatic copolyester of terephthalic acid reacted with a polyisocyanate curing agent or an elastic ester amide polymer reacted with a polyisocyanate curing agent, said adhesive being a thermosetting extensible elastic material having rapid recovery and being cured at a temperature below the relaxation temperature of the plastic sheet; and
   an antislip solvent-resistant anchor coating for the outside of said blanket on the plastic side, said anchor coating being selected form the group consisting of a nonblocking friction coating and a pressure-sensitive adhesive coating which prevent creeping of said blanket during printing.

6. A two-piece blanket assembly as claimed in claim 5, wherein said anchor coating is a solvent-resistant pressure-sensitive adhesive which comes into contact with the metal of the supporting cylinder.

7. A two-piece blanket assembly as claimed in claim 5, wherein said anchor coating is a pressure-sensitive adhesive which comes into contact with the metal of the supporting cylinder.

8. The product of claim 1 used as the inking member of a letterpress of the type known as wraparound press.

9. The product of claim 1 used as a packing material for the impression cylinder of a gravure press.

10. A method of manufacturing an elastomeric flexible laminated blanket comprising:
    coating and vulcanizing a tough smooth dimensionally stable high tensile strength, tear-resistant paper selected from the group consisting of Kraft paper, tympan paper and latex-impregnated paper with a solvent-resistant elastomer having a Shore A Durometer hardness value between about 30 and about 95;
    adhesive laminating said coated and vulcanized paper to a biaxially stress-oriented plastic sheet selected from the group consisting of polyethylene terephthalate and cellulose acetate;
    the adhesive of said laminate consisting essentially of an aliphatic copolyester of terephthalic acid reacted with a polyisocyanate curing agent or an elastic ester amide polymer reacted with a polyisocyanate curing agent, said adhesive being a thermosetting extensible elastic material having rapid recovery;
    curing the adhesive of said laminate at a temperature below the relaxation temperature of the plastic sheet; and
    coating the outside of the blanket with an antislip, solvent-resistant anchor coating, said anchor coating being selected from the group consisting of a nonblocking friction coating and a pressure-sensitive adhesive coating which prevents creeping of said blanket during printing.

* * * * *